(No Model.) 5 Sheets—Sheet 1.
H. G. BEATLEY.
APPARATUS FOR TREATING METAL PIPES.
No. 378,756. Patented Feb. 28, 1888.
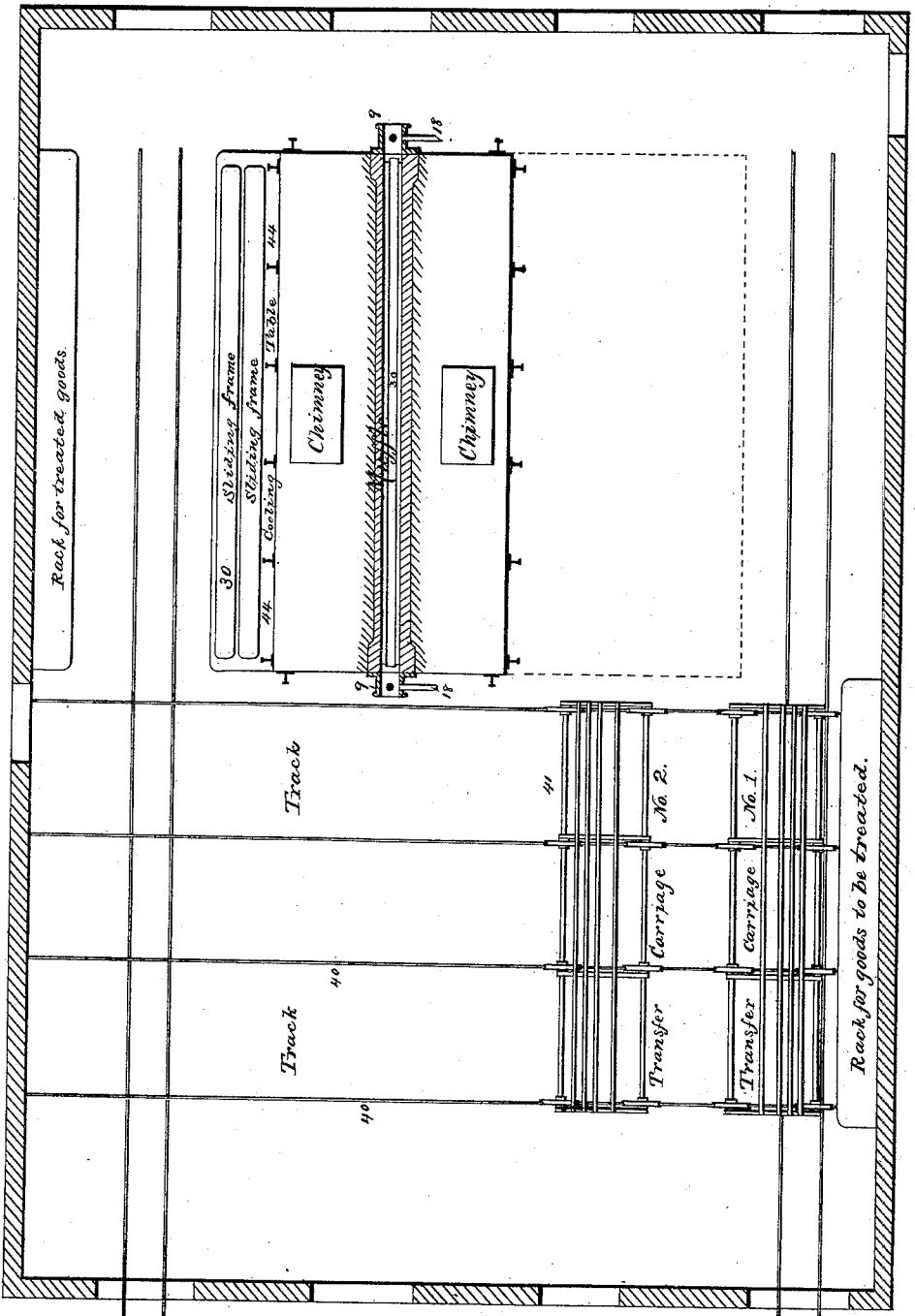

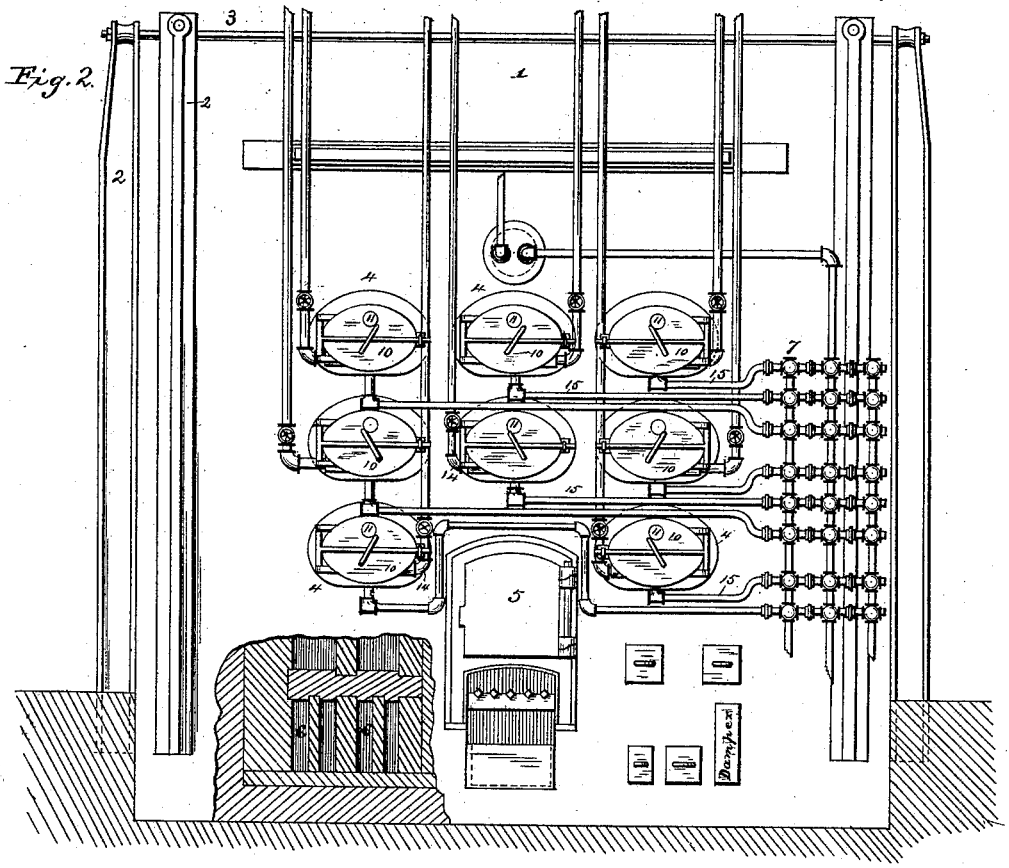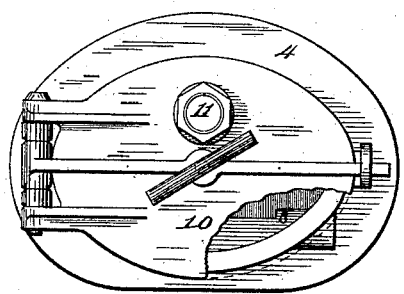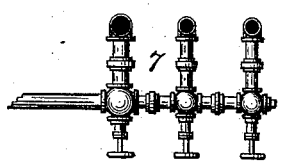

(No Model.)  5 Sheets—Sheet 3.

H. G. BEATLEY.
APPARATUS FOR TREATING METAL PIPES.

No. 378,756. Patented Feb. 28, 1888.

Witnesses.
Chas. R. Bell.
Sidney L. Johnson.

H. G. Beatley,
Inventor.
by Foster & Freeman
his Attorneys.

(No Model.) 5 Sheets—Sheet 4.

H. G. BEATLEY.
APPARATUS FOR TREATING METAL PIPES.

No. 378,756. Patented Feb. 28, 1888.

(No Model.) 5 Sheets—Sheet 5.
H. G. BEATLEY.
APPARATUS FOR TREATING METAL PIPES.
No. 378,756. Patented Feb. 28, 1888.
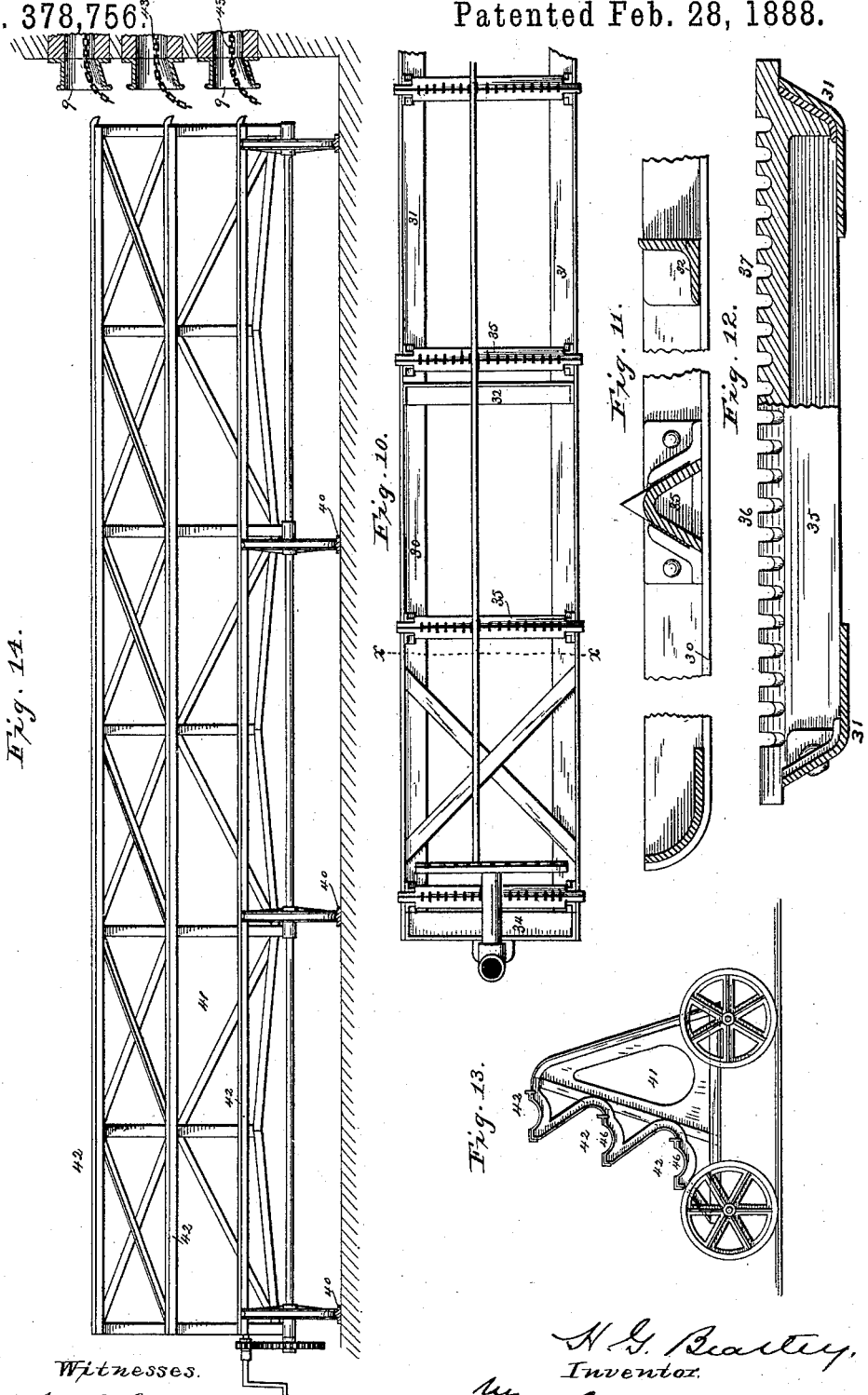

UNITED STATES PATENT OFFICE.

HENRY G. BEATLEY, OF ITHACA, NEW YORK.

APPARATUS FOR TREATING METAL PIPES.

SPECIFICATION forming part of Letters Patent No. 378,756, dated February 28, 1888.

Application filed June 11, 1887. Serial No. 241,056. (No model.)

*To all whom it may concern:*

Be it known that I, HENRY G. BEATLEY, of Ithaca, Tompkins county, and State of New York, have invented certain new and useful Apparatus and Machinery for the Purpose of Handling and Treating Metal Pipes, Fittings, and Connections; and I do hereby declare that the following is a full, clear, and exact description thereof, which will enable others skilled in the art to which my invention pertains to make and use the same, reference being had to the accompanying drawings, and to the letters of reference marked thereon, which form part of this specification.

Figure 5:
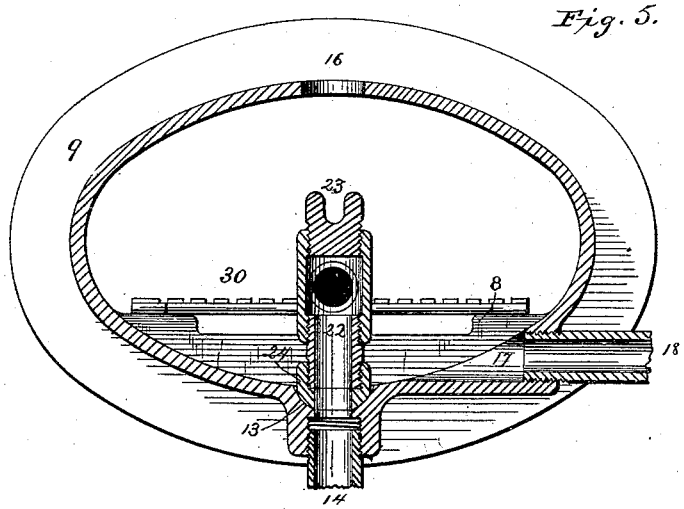
Figure 6:
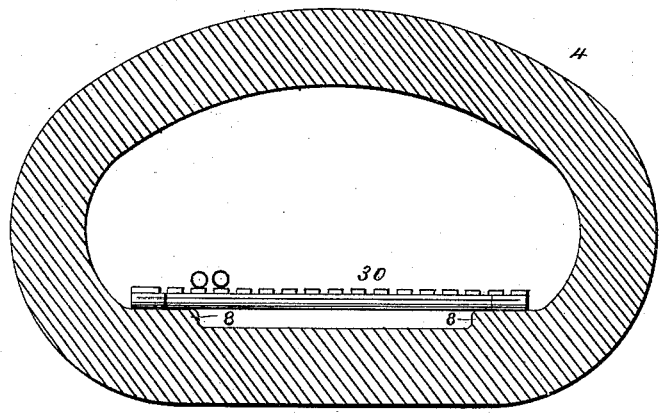
Figure 7:
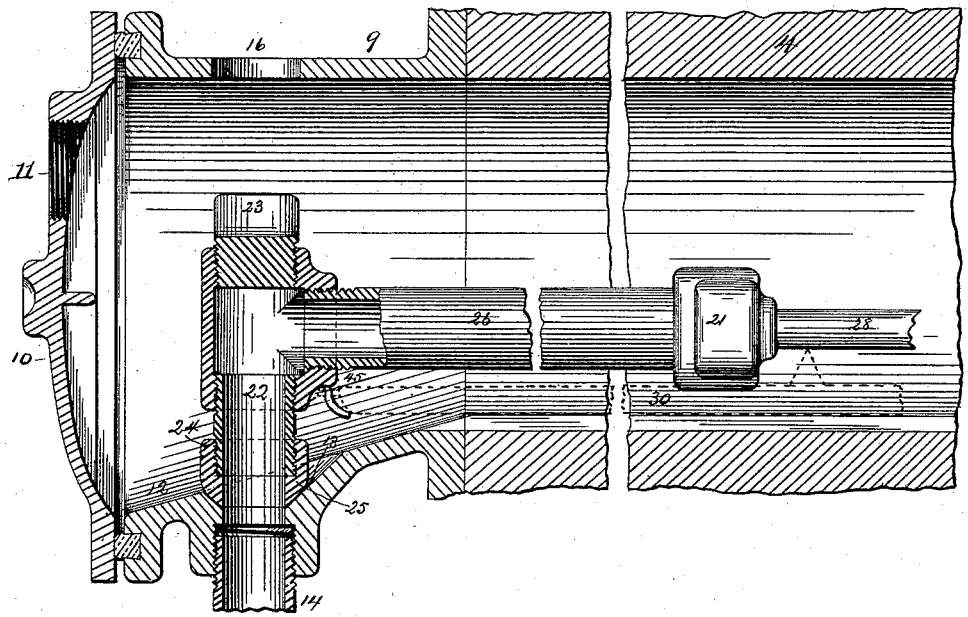
Figure 8:
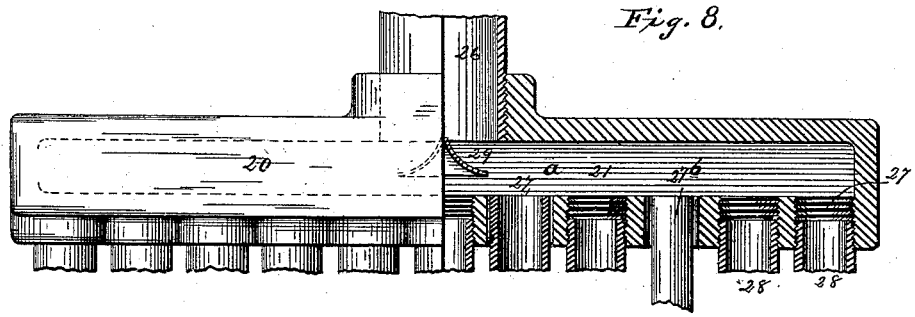
Figure 9:
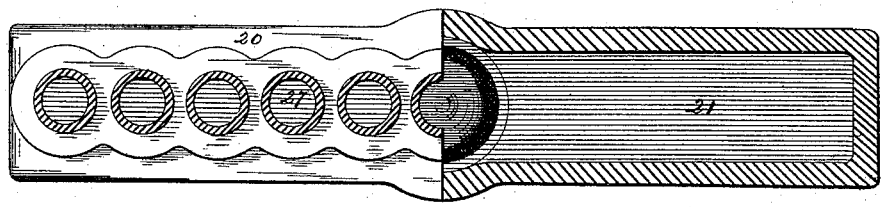

Figure 1 is a plan view showing the general arrangement of the muffles, carriages, tracks, &c., in a building adapted and arranged for the purposes set forth. Fig. 2 is a front elevation, partly in section, showing a preferred form of furnace or bench of muffles in which the pipes and connections may be treated. Fig. 3 is an enlarged end view, partly in section, of the mouth-piece of one of the muffles. Fig. 4 is a detail showing the nest of valve-connections for controlling the air or gases used in the treatment of the pipes. Fig. 5 is a transverse section through the mouth-piece of the muffle. Fig. 6 is a transverse section through the muffle. Fig. 7 is a longitudinal section through the mouth-piece and a portion of the muffle, showing the distributer. Fig. 8 is a plan view, partly in section, of the distributer. Fig. 9 is a side view, partly in section, of the same. Fig. 10 is a plan view of the frame for supporting the pipes to be treated. Fig. 11 is a detail sectional view of the frame, showing the knife-edges. Fig. 12 is a transverse section of the frame on the line *x x*, Fig. 10. Fig. 13 is an end view of the carriage, and Fig. 14 is a side view showing the carriage in its relative position to the muffles.

The object of my invention is to render commercially effective the handling and disposing of metal pipes and other material in and in connection with a bench or furnace of muffles wherein they are placed for treatment with gases, vapors, &c.

The apparatus which I have described and illustrated in the present application is intended more particularly for use in connection with the treatment of iron and steel pipes, their fittings, connections, &c.; but of course it may also be used for other articles for which it is adapted, and it will be understood that the various details may be changed to suit the special class of articles to be treated without departing from the principles of my invention.

My invention consists in the combination and arrangement of a furnace or bench containing air-tight muffles or retorts, in which the articles or materials to be treated are placed and sealed, and of a system of pipes, conduits, heaters, superheater, carriages, frames for supporting the pipes, distributers, and other apparatus to be used in connection therewith.

It also consists in the details of construction and arrangement of said devices, substantially as is more particularly pointed out hereinafter.

In the treatment of pipes and other articles I make use of a bench or stack of muffles, which may be arranged in any convenient and desired manner, and in Fig. 2 I have shown one arrangement which I have found exceedingly useful and practicable, and it consists of the necessary walls of fire brick and tile, forming the bench 1, which are held together by suitable buck-staves, 2, and bolts 3, in the usual manner. The bench is shown as having eight muffles, 4, arranged horizontally upon suitable piers around the furnace 5, having flues 6, for directing the products of combustion around the muffles, and provided with an arrangement of pipes and connections, 7, whereby the desired gases or vapors may be admitted into the muffles, in a manner more particularly set forth hereinafter. These muffles are substantially of D form in cross-section, and are made of fire-clay, cast or wrought iron, or steel, as desired. The base of the muffles 4 is thickened on the sides, so as to form projections or ways 8, extending throughout the length of the muffle, which form a track to support the frame upon which the articles to be treated are carried. The ends of the muffles are provided with mouth-pieces 9, which are closed by doors 10, in the usual manner, the doors being provided with sight-holes 11, through which the operations within the muffle can be observed. The lower portions of the mouth-pieces are inclined, as shown at 12, and are provided with spherical sockets 13, communicating with the inlet-pipes 14, which are connected to the nest of valves 7 by the pipes 15, so that the various gases or vapors may be passed directly into the mouth-pieces of the muffle. In order that the socket may be easily and cheaply formed in the mouth-pieces, openings 16 are made in the tops thereof, through which suitable tools may be passed to drill or grind the sockets, and these holes may be suitably plugged or otherwise closed after serving their purpose. Openings 17 are also provided in the side near the bottom of the mouth-pieces, in which are fitted the purge-pipes 18, through which the gases or vapors are delivered after performing their functions in the muffle.

Sometimes it is desirable to deliver the gases and vapors from the rear ends of the muffles, and the purge-pipes in the front mouth-pieces or inlet end of the muffle are then closed and the rear ones are opened; but I generally prefer to deliver them from the ends of the muffles through which they are introduced, in which case, of course, it will be understood that the purge-pipes in the mouth-piece at the rear ends of the muffles will be closed by suitable valves, and the front valves are opened, allowing the gases to move through the interior of the pipes and back over their outer surfaces to the front end.

In order to properly direct the gases and vapors into and around the pipes or other articles to be treated, I provide a distributer, 20, which is shown as consisting of a body-piece, 21, having a right-angled connection, 22, one end of which is preferably closed by a plug, 23, and the other end is provided with a socket-piece, 24, having a spherical-shaped surface, 25, adapted to fit a spherical socket, 13, in the mouth-piece of the muffle. The body 21 extends laterally from the inlet-pipe 26, and in the face thereof are provided a series of sockets, 27, the said sockets being preferably made of a size to fit the various pipes, 28, which are to be treated, which latter are seated in the sockets, and preferably screwed therein, so as to form a tight connection between the distributer and the pipes. I have found, however, that it is not absolutely necessary to have a tight connection even in treating pipes, and in that case the pipes may be fitted into the sockets as shown at 27$^a$, and when it is desired to treat solid rods of metal or pipes only upon the outside surface they may be placed loosely in the socket, as shown at 27$^b$, and the gases and vapors will pass through the openings between the rod and the socket into the muffle, and thence through the rear purge-pipe.

In order that the vapors or gases may be more evenly distributed, I provide a deflector, 29, which is arranged centrally with regard to the inlet-pipe 26 and serves to direct the gases evenly into both branches of the distributer.

It will thus be seen that the pipes and distributer are preferably connected together before they are introduced into the muffles, and in order that they may be conveniently and easily handled I provide a frame, 30, which may be made in any suitable manner, and preferably of side plates, 31, connected by suitable cross-pieces, 32, and braces 33, and head-pieces 34. Also extending between the side plates, 31, is a bar, 35, preferably V-shaped, as shown in Fig. 11, and provided on its upper surface with a knife-edge, which is preferably provided with recesses or notches 37. These knife-edges furnish a bearing for the pipes and support them by the least possible contact as the pipes expand and contract during the process of treatment, and are secured at one end, as hereinafter stated. These small bearing-surfaces will vary in position on the pipe, so that practically all parts of the outside surfaces of the pipes are exposed to the treatment of the gases or vapors.

In order that the frame, with its complement of pipes and distributers, may be conveniently handled, I provide suitable tracks, 40, upon which run one or more carriages, 41, which may be suitably constructed to adapt them for the purpose intended. I have shown in Fig. 13 an end view of a carriage adapted for the furnace illustrated in Fig. 2, and it will be seen that it is provided with three sets of ways, 42, on different levels conforming to the levels of the mouth-pieces of the muffles 4 in the furnace, and it will be seen that the frame, with its pipes, being placed upon any one of the ways of the carriages, may be easily transported, so as to occupy a position directly in front of and on a level with its respective mouth-piece, as shown in Fig. 14, when the frame may be pushed or drawn into the muffle. In the present instance I have shown as a means of drawing the frame into the muffles a chain, 43, which may be connected to any suitable winch at the opposite end of the muffle, and thereby the frame may be quickly and easily withdrawn from the carriage and moved along the ways 8 of the muffle and supported thereon during the process of treating the pipes. When the pipes have been sufficiently treated, they may be withdrawn from the muffles onto the carriage arranged in proper position by means of a winch, which may be placed upon the carriage or otherwise located in a convenient position, and the chain in the muffle being attached to the frame is drawn forward and left in the muffle to be connected to the next succeeding frame which is to be placed therein, when the carriage, with its load of treated pipes, may, if desired, be moved opposite the cooling-table 44, and the frame 30 may be drawn onto the table and the pipes left there the desired length of time to cool or set. From here they may be placed onto a suitable car and conveyed to the desired place, or put upon a rack arranged in juxtaposition thereto for storage.

While I have shown in the drawings a nest of pipes, 7, having various connections whereby different gases and vapors may be treated, I have not herein specifically described the same, as they form no part of my present invention, and are merely shown to illustrate the full operation of my invention.

It will be observed that the mouth-pieces 9 are provided with inclined bases, as before described, said bases being provided with spherical sockets connected to the inlet-pipe 14. The object of this construction will now be apparent. When the frame 30, with its load of pipes connected to the distributer 21, is drawn into the muffle, the spherical-shaped socket-pieces 24 will impinge upon the edge of the incline 12, and, riding up the incline as the frame is moved to position, will eventually fall into the socket 13, and the parts being ground to fit accurately they will make a practically gas-tight joint or connection when the spherical-shaped socket-piece is seated in its correspondingly-shaped socket, and in this way we avoid all luting or other connection between the distributer and the inlet-pipes at each charge of the muffles.

In order to prevent the displacement of the distributer and pipes by the friction of the socket-pieces on the inclined way, I provide a suitable lock or connection, 45, which may be of any convenient construction, that shown being well known and needing no specific description. As the frame with the projecting socket-piece of the distributer is to slide onto the ways 42 of the carriage, I have made the central portions of the brackets supporting the ways curved, as shown at 46, so as to permit the free passage of the socket-piece without interference therewith.

From the above description the operation of my improved constructions and arrangements will be readily understood without a detailed recitation thereof, and it will be seen that I provide means whereby the pipes may be easily and quickly handled, and the operations may be practically continuous, as one muffle may be discharging while another is being filled, and the majority of them may be at the same time utilized in treating pipes.

Having thus described my invention, what I claim is—

1. In an apparatus for treating pipes, the combination, with a bench of muffles, each muffle being provided with a way, of a carriage provided with ways corresponding to the ways in the muffles, a frame carrying a distributer to which the pipes to be treated are attached, and means for drawing said frame, distributer, and pipes from the ways on the carriage to the ways in the muffles, substantially as described.

2. A muffle provided with ways, a frame adapted to support the articles to be treated and sliding on said ways, and a distributer connected to and carried by said frame, substantially as described.

3. The combination, with a muffle the mouth-piece of which has an inclined base provided with a socket, of a distributer provided with a socket-piece adapted to fit said socket, substantially as described.

4. A muffle the mouth-piece of which is inclined and provided with a socket, in combination with a frame adapted to slide in said muffle, and a distributer carried by said frame and having a socket-piece adapted to fit the socket, substantially as described.

5. The combination, with a muffle the mouth-piece of which is provided with a socket, of a distributer the body of which is provided with side projections having sockets into which the pipes or bars are fitted, and an inlet-pipe having a socket-piece to fit the socket in the muffle, substantially as described.

6. A distributer consisting of an inlet-pipe and a body having lateral projections provided with sockets into which the articles to be treated are fitted, and a deflector arranged in front of the inlet-pipes, substantially as described.

7. The combination, with a muffle the mouth-piece of which is inclined and provided with a socket, of a distributer consisting of an inlet-pipe and lateral projections, and a vertical connection provided with a socket-piece adapted to fit the socket in the inclined base, substantially as described.

8. The combination, with a muffle, of a frame adapted to slide therein, the said frame being provided with knife-edged supports, upon which the articles to be treated in the muffle are arranged, substantially as described.

9. The combination, with a muffle, of a frame sliding therein, the said frame being provided with knife-edged supports for the articles to be treated, and a distributer connected to the articles and secured to said frame, substantially as described.

10. The combination, with a muffle, of a distributer having sockets to which the pipes to be treated are connected, inlet-pipes leading to the distributer, and a purge-pipe opening, as 17, located at the front end of the muffle, whereby the gases pass through the distributer to the inside of the pipes and back over the outside of the pipes to the purge-pipe, substantially as described.

In testimony whereof I have signed my name to this specification in the presence of two subscribing witnesses.

HENRY G. BEATLEY.

Witnesses:
J. S. BARKER,
CHAS. MORRIS, Jr.